Sept. 8, 1936.  W. JANOVSKY  2,053,560
DEVICE FOR MEASURING MECHANICAL FORCES AND MOMENTA
Filed June 26, 1933   2 Sheets-Sheet 2
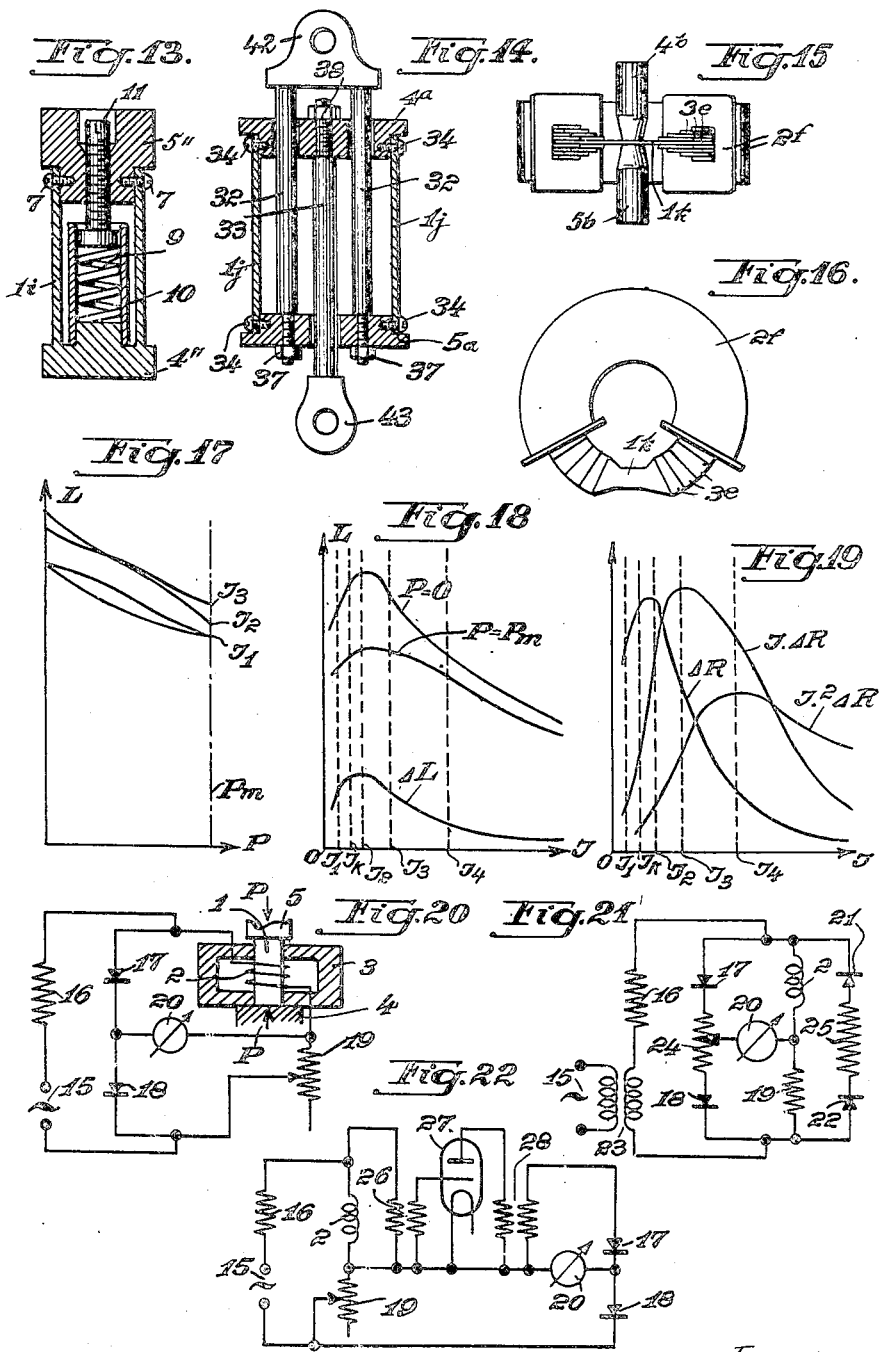

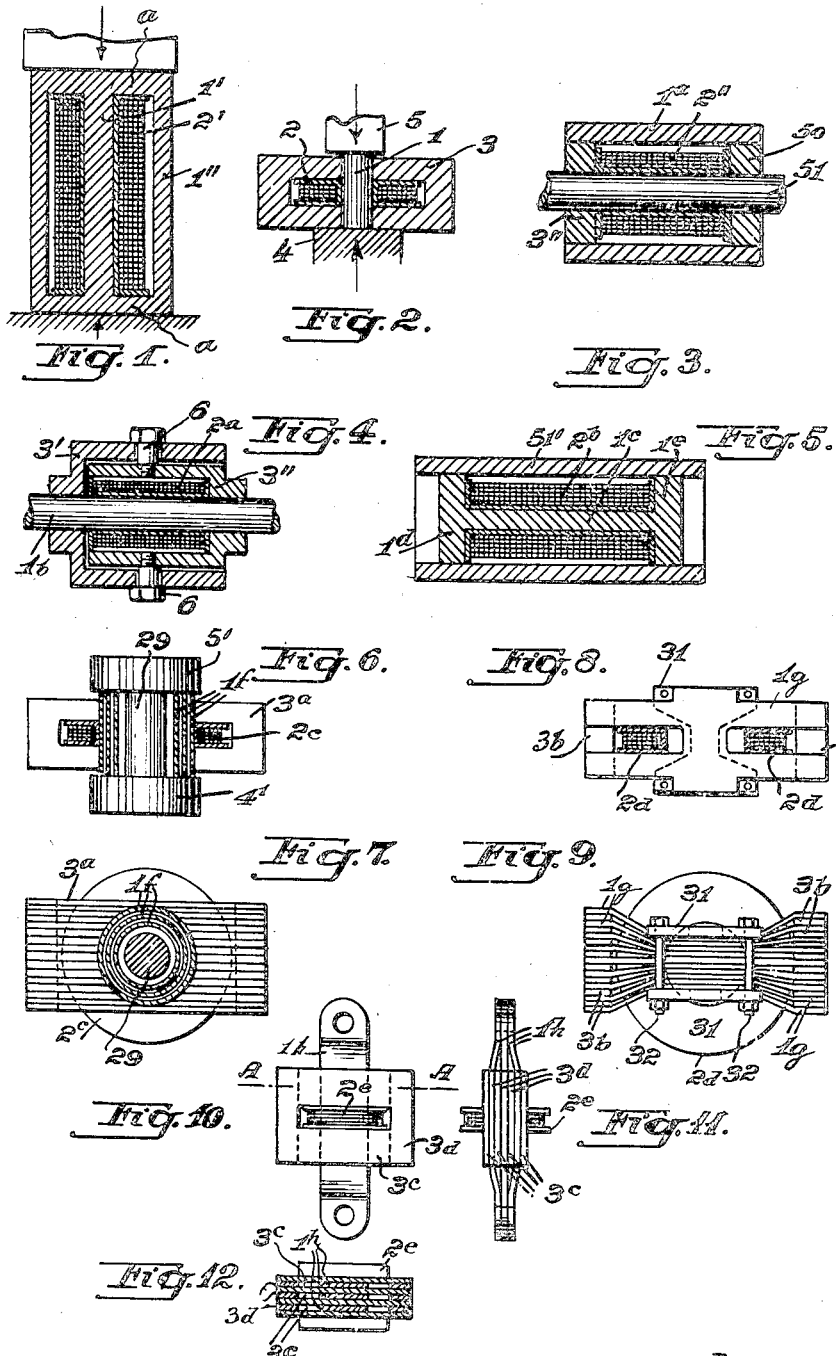

Patented Sept. 8, 1936

2,053,560

UNITED STATES PATENT OFFICE 2,053,560

DEVICE FOR MEASURING MECHANICAL FORCES AND MOMENTA

Wilhelm Janovsky, Berlin-Spandau, Germany, assignor to Siemens & Halske, Aktiengesellschaft, Siemensstadt, near Berlin, Germany, a corporation of Germany Application June 26, 1933, Serial No. 677,705
In Germany June 27, 1932

11 Claims. (Cl. 177—351)

The invention relates to a device for measuring mechanical forces or momenta, more particularly such as occur in constructional parts of buildings or machines. For this end, it has already been suggested to make use of the well-known phenomenon that the permeance of an iron body magnetized with the aid of a coil varies, if this body is subjected to exterior forces. The present invention relates to an extremely suitable device for practically solving this question. It consists in that, for the purpose of increasing the effect of the bodies, the permeance of which is under test (test box), a magnetic circuit is set up which consists throughout of a highly permeable material.

This enables, in addition, the disturbing influences of exterior magnet fields to be avoided, which would be most pronounced and would impair the accuracy of measurement, if the body subjected to the forces or momenta under test were made of a nickel-iron alloy extremely favourable for this purpose in other respects and having a relatively great permeance. The prejudicial effects of this phenomenon are considerably reduced by setting up a closed magnetic circuit as dimensioned according to the invention.

It has been found that the greatest effect can be obtained if provision is made for subjecting all or almost all the parts of the closed magnetic circuit to the stress under test. For constructional or other reasons, one is however sometimes obliged to subject only part of the magnetic circuit to the forces or momenta under test. In this case, it is of advantage to dimension the various parts of the magnetic circuit so as to impart to such parts of the magnetic circuit as are not subjected to the forces or momenta under test a permance which is high as compared with that of the part subjected to these forces or momenta, which part will be called hereafter the test body.

If it is intended to measure the force or momenta occurring, for instance, in any given constructional part of a machine, without applying constructional modifications to the machine under consideration by installing a special test box, it may, in some cases, be of advantage to use the machine part under consideration as the test body, if it should consist of ferro-magnetic material, say steel. Though steel used for machine parts has the advantage of great strength, it is not very well adapted for the present measurements, since a variation in permeance by only a small percentage from its original value, corresponds to a variation in load within the elasticity limit.

Considerably greater effects are, however, obtained, if the test body is made of a highly suitable material. According to the invention, such ferro-magnetic substances are most suitable for the purpose as have mono-crystals in which the magnetostriction is of the same sign in the direction of the crystallographic axes and which have, in addition, small internal strains. These may principally be kept small by special thermic treatments; in this connection, I will mention nickel-iron alloys having a percentage of nickel of 40-80.

The test box may be made in widely different ways according to the particular field of application. In general, it will be advantageous to give the magnetic circuit the shape of a shell transformer consisting of a core carrying the test winding and of a shell constituting the closed iron circuit.

The magnetization by alternating current gives rise to eddy currents in the test body, which considerably reduce the power more particularly in case of A. C. of relatively high frequency which involves a deformation of the field. These disturbing influences and others can be eliminated by sub-division of the test body. The usual manner of composing iron-cores, magnetized by alternating current, of thin sheets involves, however, for the present purpose a prejudicial reduction in mechanical strength and other material drawbacks.

A constructional example of a test box which is extremely well adapted for avoiding these drawbacks contains a test body consisting, according to the invention, of one or more thin-walled parts which extend through the forces under test in the direction of the mechanical strain and are as far as necessary, insulated from one another. In order to obtain sufficient strength in the case of compressive forces as well, use should be made, as a test body, of one or more hollow cylinders which are stressed in the axial direction. The thickness of the hollow cylinder walls can be adapted, in a well-known manner, to the frequency of the alternating current. This constructional example has the advantage that the test body has imparted to it a relatively high bending strength, even if use is made of thin-walled tubes. If, however, in the case of very great forces, the strength of the test body proper is not sufficient, it may be increased by a solid piece, say a solid cylinder taking up part of the forces under test.

If the thin-walled parts constituting the test body and extending in the direction of the forces under test are to be piled up in the shape of sheets, the sheets building up the test body are preferably held together only to an extent necessary to prevent the various sheets from being bent outwards under the action of compressive forces.

In case of need, the test body proper can also be completed by one or several solid pieces, taking up part of the forces under test, and in this case the clamping jaws used for keeping the sheets together may also be used for throwing off the load.

Since the various ferro-magnetic materials behave in general differently in the case of tensile forces and compressive forces, difficulties may be encountered, if a test set of the described type is subjected to forces of alternating direction. In order to avoid these, the test body according to the invention may be subjected to a permanently acting constant tensile or compressive strain. This measure has, in addition, the advantage of a certain mechanical stiffening produced by the mechanical bias.

In order to enable test boxes designed for the measurement of tensile forces, to be made of material particularly suitable for compressive stresses, the compressive pieces serving for the transmission of the forces under test to the test body can also be equipped with means for transmitting tensile forces acting in the opposite direction. The same holds good, if, for measuring compressive forces, use is to be made of test bodies of such material, as is most suitable for tensile stresses.

In some cases it may be preferable to build up the iron body in such a manner that the test body proper which is subjected to the forces under test is constituted by part of the circular area of one or more thin circular sheets, which in terms of the area are strained perpendicularly to their surface by the forces under test.

If the cross-sectional area of a single sheet is not sufficient or as for instance, with high-frequency alternating current, must be further subdivided, use may also be made, as a test body, of several annular sheets piled up and insulated from one another; however as insulating material, there must be chosen one whose strength is sufficient to deal with the forces under test.

As has already been mentioned, for measuring the permeability of a test body, use is preferably made of a method in which alternating current is passed through the exciting winding serving for magnetizing the test body. It has been found that it is advantageous in this case to employ a magnetization exceeding the degree used up to the present.

In the accompanying drawings, Figs. 1 and 2 are vertical sections of two embodiments of my invention designed particularly for measuring compression; Figs. 3, 4 and 5 are axial sections of three embodiments designed for measuring torsion; Fig. 6 is an elevation, with parts in section, of another embodiment for measuring compression; Fig. 7 is a plan of the construction shown in Fig. 6, with parts in section; Fig. 8 is a vertical section, and Fig. 9 a plan of still another embodiment adapted for measuring compression; Fig. 10 is a front elevation and Fig. 11 a side elevation of an embodiment of my invention designed particularly for measuring tension; Fig. 12 is a cross section on line A—A of Fig. 10; Figs. 13 and 14 are fragmentary sectional views illustrating two further embodiments designed particularly for measuring tension; Figs. 15 and 16 show another embodiment, designed for measuring compression, in elevation and plan view respectively; Figs. 17, 18, and 19 are diagrams illustrating the electrical and magnetic conditions involved in my invention; and Figs. 20, 21, and 22 illustrate three different circuit arrangements which may be used in connection with my invention.

Fig. 17 represents the variation in inductivity L of a test body magnetized by different exciting currents $J_1$, $J_2$, $J_3$ under the action of variable mechanical forces P. It will be seen that in all the cases the inductivity decreases as the strain on the test body increases from $P=O$ to $P=P_m$. For the current intensity $J_1$ which is in accordance with the degree of magnetization used up to now, different characteristics are obtained with increasing and decreasing strain, on account of hysteresis phenomena. In practice these phenomena disappear, however, entirely if, according to the invention, the intensity of the exciting current is increased beyond the limit determined by the coercive force of the material. As may be seen from the curves designated by $J_2$ or $J_3$ as corresponding to higher intensities exceeding the limit of the coercive force, measurement results are obtained independently of whether the measurements are effected with increasing or decreasing forces P.

Fig. 18 shows how the inductivity L varies with increasing exciting current intensity, that is, on the one hand, in the unstrained condition $(P=O)$ and, on the other hand, in the strained condition $P_m$ of the test body. The current intensities $J_1$, $J_2$, $J_3$ in accordance with Fig. 17 are also indicated in Fig. 18, as well as an exciting current intensity $J_k$, corresponding to the coercive force of the material concerned, the relation of these current intensities being $J_1 < J_k < J_2 < J_4$. Now, if, in addition, the difference of the values of L is also plotted for $P=O$ and $P=P_m$ respectively one obtains the curve designated by $\Delta L$, which shows a maximum for a value of the exciting current intensity between $J_k$ and $J_2$.

The difference of the inductive resistance $\Delta R = \omega.\Delta L$ corresponding to $\Delta L$ and showing, of course a maximum at the same point had been plotted in Fig. 19. But further consideration shows that the test voltage V available for the measurement, in say a compensation device, corresponds to the product $J.\Delta R$, equally plotted in Fig. 19. It may be recognized from the graph that the peak value of the measuring voltage V lies in the neighbourhood of the intensity $J_3$. The curve designated by $J^2.\Delta R$ represents a measure of the corresponding power whose maximum appears to be considerably more shifted in terms of a stronger magnetization.

The graphs show that an exciting current intensity exceeding the value $J_k$ offers the further advantage that the voltage available for the measurement, viz. $J.\Delta R$ is still further increased. It may in some cases even be advantageous to make the exciting current intensity higher than the intensity $J_3$ corresponding to the maximum of $J.\Delta R$, so as to reach the value $J_4$, in order to come into the range of maximum power $J^2.\Delta R$. This will more particularly be advisable, if small forces are to be measured and correspondingly the cross-sectional area of the test body or its volume must be chosen relatively small since, in this case, the available power is also small.

Another important advantage lies in the increased magnetization insofar as, with a suitably chosen exciting current intensity, the variations in the exciting voltage may, to a certain extent, be compensated for. For this end it is preferable to make use of an intensity in the neighborhood of $J_3$, as the curve of the test voltage $J.\Delta R$ shows in this case a maximum and, due to variations in voltage, intensity changes have the least influence on the height of the voltage $J.\Delta R$ corresponding to the force under test.

As has already been mentioned, the permeance of the test body is preferably measured by means of a compensation method, e. g. in the shape of a Wheatstone bridge. The magnitude of the impedance of the exciting winding of the test body is in this case compared with that of a known resistance. It is of special advantage to use a Wheatstone bridge balanced in the unstrained condition of the test body, so as to enable the current flowing through the measuring instrument in the diagonal branch to disappear, the deflection on the measuring instrument being thus a measure of the forces or momenta straining the test body under test.

Fig. 20 schematically shows the D. C. compensation device. The A. C. source 15 is connected through a series resistance 16 to the branching points of the bridge, in the arms of which there are connected two rectifiers 17 and 18 respectively the exciting winding 2 of the test body 1 and a suitable adjustable reference resistance 19. At 3 I have indicated a yoke or shell in contact with the test body or core 1. This shell completes the magnetic circuit. A D. C. measuring instrument 20 lies in the diagonal branch of the bridge.

The measurement is effected by first adjusting the reference resistance 19 in such a manner as to cause the instrument 20 to give no deflection in the unstrained condition of the test body. In this case, the amount of the resistance 19 is equal to that of the impedance (R) of the exciting winding 2 of the test body. If now the test body 1 is strained by the force under test, P, for instance through the medium of a pressure member 5, the magnitude of the impedance (R) of the exciting winding 2 varies and the instrument 20 gives a deflection corresponding to this variation ($\Delta R$) which may be taken as a measure of the force P under test. Since, for the measurement the simple magnitudes of the resistances are taken into account, regardless of the phase condition of the voltages use can be made of a simple ohmic resistance, as a reference resistance, and a special phase compensation can be dispensed with. It must, however, be admitted that, in this case, the instrument lying in the diagonal branch of the bridge is also traversed by an A. C. component. If this is considered to be objectionable, means well-known in the art may be used also to balance the phases of the impedances of the exciting winding of the test body and of the reference resistance which are to be compared, so as to enable both the direct current and the alternating current to disappear in the diagonal branch of the measuring device.

Due to the variation in resistance ($\Delta R$) of the exciting winding, the exciting current intensity J in the winding would also vary with constant voltage of the A. C. source, but this variation would be opposed in sign. The product $J.(\Delta R)$ responsible for the magnitude of the instrument deflection would thereby be reduced. To avoid this, the bridge should be connected across a series resistance 16 which should be chosen sufficiently high to enable the variable resistance of the exciting winding to become negligible as compared therewith. The exciting current intensity remains therefore approximately constant irrespective of the strain on the test body.

The circuit shown in Fig. 20 has also the drawback that the current magnetizing the test body has a different value in the two half-cycles, since in the blocking direction of the rectifier the whole of the current passes through the winding 2, whereas in the transmitting direction the current is reduced by the amount passing through the rectifier. In the circuit shown in Fig. 21, this drawback is avoided by the addition of another bridge arm containing two rectifiers 21 and 22 which differ in polarity.

The A. C. source 15 is, in Fig. 21, connected through a transformer 23. In addition, the reference resistance 19 is not made variable, but a resistance 24 is connected in the bridge arm between the rectifiers 17 and 18 and has been given a variable tap for connection to the D. C. measuring instrument 20. The tap serves for the bridge balance in case of a strain $P=O$. A resistance 25 of equal magnitude is connected in the other bridge arm between the rectifiers 21 and 22. The series resistance 16 is designed to keep the current intensity approximately constant irrespective of the strain on the test body.

In order to obtain a sufficiently great deflection of the instrument even with relatively small forces, use should be made of an amplifying device for amplifying the voltage impressed on the terminals of the exciting winding of the test body. Such a circuit is, for instance, shown in Fig. 22 which as to its other parts is fundamentally in accordance with that shown in Fig. 20. The A. C. source 15 is again connected through a series resistance 16 to the bridge of which one branch contains the winding 2 of the test body and the adjustable reference resistance 19. The primary of a transformer 26 whose secondary is connected to the filament and the grid of an amplifier valve 27 is mounted in parallel with 2. The plate circuit of the valve 27 is connected across the transformer 28 to the rectifier 17 and the D. C. instrument 20, in such a manner that the secondary of the transformer 28, instead of the winding 2, jointly with the reference resistance 19, forms one bridge arm and the rectifiers 17 and 18 the other one, the instrument 20 lying in the diagonal branch. This enables the voltage impressed on the terminals of winding 2 to become, with adequate amplification, effective in the D. C. compensation circuit.

Fig. 1 is a schematic representation of a device for measuring compressive forces. The test box which consists of a core 1', carrying the exciting winding 2', is surrounded throughout or enclosed by a shell 1" rigidly connected with the core by transverse portions or heads $a$. The whole assembly forms an iron body which has been given the shape of a shell transformer and may be strained in the way indicated by the arrows so as to enable nearly all the parts of the closed magnetic circuit to be subjected to the compressive forces under test. The transverse portions $a$ interposed between the ends of the core 1' and the ends of the shell 1" are not subjected to such compression forces, but serve to complete the magnetic circuit.

A similar form of a device used to measure compressive forces is shown in Fig. 2. In this case, it is only the core 1 preferably made of nickel-iron and carrying the winding 2, which is subjected to the compressive forces, whereas the shell 3 which may, for instance, consist of an iron tape or wire wrapping or may be built up of individual sheets merely completes the magnetic circuit and is, according to the invention, dimensioned so as to have a high permeance as compared with that of the test body. In order to allow only the core to be strained by the compressive forces under test, the core is made to project slightly from the shell. If, under the action of the compressive forces exerted for instance through the pressure member 5, the core should be liable to break, the shell must be made so strong as to enable it to withstand the compressive forces under test, after the core has been broken. The parts 1, 2, 3, 4, 5 of Fig. 2 are of practically the same construction as in Fig. 20.

For measuring torsional forces or torques, use can also be made of a test body shaped as that shown in Fig. 1 and having, for instance, at its two faces coupling elements for suitable connection so that said test body will be subjected to the same torsion as the shaft whose torsional tension or strain is to be measured. In this case, the ends of the winding which rotates with the shaft must, of course, be led to slip rings which, in a manner well-known in the art, are mounted on the shaft but insulated from it and enable brushes connected to the measuring set to slide over them.

Fig. 3 shows a special constructional example of a device for measuring the torsional tensions or torques occurring in a shaft, in which example the shaft whose strain is to be measured is used directly as part of the magnetic circuit. This offers the advantage that a special test box need not be fitted within the shaft. On both sides of the exciting winding 2', the two ring-shaped discs 50 are closely fitted to the shaft 51, and the cylindrical tube 1a preferably made of nickel-iron and serving as a test body is equally tightly coupled with the two discs 3'', at both ends. In this construction, the magnetic circuit is formed by the parts 1a, 50, 51.

In the constructional example shown in Fig. 4 only the shaft 1b carrying the winding 2a is strained by torsion, whereas the shell merely closing the iron circuit is composed of two portions 3' and 3'' tightly coupled to the shaft each at one end and nested with slight play in the manner shown in the drawings. If now the shaft is distorted under the action of the forces under test, the two portions 3' and 3'' of the shell will be correspondingly shifted with respect to one another. As a protective measure for the case of a fracture of the shaft serving as the test body, the shell portion 3'' may be equipped with one or several screws or other projections 6 engaging with adequate play with corresponding slots of the exterior shell portion, 3'.

The device shown schematically in Fig. 5 is more particularly of advantage, if the torque transmitted by means of a hollow shaft is to be tested. For measuring the torsional forces acting on the shaft, use is, in this case, according to the invention, made of a test body 1c, 1d, 1e preferably consisting of nickel-iron which has been given the shape of a coil body or core and carries the test winding 2b. This test body is slipped into the hollow shaft 51 and tightly coupled with it at the two flanges 1d and 1e, so as to enable it to be also distorted under the action of the torsional forces. Another method which is applicable to hollow shafts consists in fitting a test body, of the type shown in Fig. 1, within the shaft and coupling the shell 1'' tightly to the shaft, for instance, by shrinking, so as to enable part of the torque to be transmitted by the core 1' and the shell 1''. In this case also, slip rings and brushes, not shown in the drawings, are used for the connection with the measuring instrument.

Figs. 6 and 7 show another constructional example of a test box with the upper pressure piece removed in Fig. 7. The test body 1f consists of three thin-walled concentric tubes which are insulated from one another at the cylindrical faces, by air or other suitable insulating means. An insulation of the end faces in order to avoid eddy currents is not necessary and even not desirable, since the transmission of the compressive forces under test from the pressure pieces 4', 5' to the end faces of the tubes 1f should be as direct as possible. For reducing the load, a solid cylinder 29 may be fitted within the innermost of hollow cylinders 1f. In order to ensure a uniform transmission of the compressive forces, the end faces of all the pressure pieces should be made as plane as possible, for instance by means of common plane loops. 2c is the test winding surrounding the test body and 3a is a yoke of magnetic material composed in the usual manner of sheets and having a suitable opening for accommodating the cylindrical test body in order to produce a reliable uninterrupted magnetic circuit.

The test box represented in Figs. 8 and 9 is a test body built up of a plurality of sheets 1g in the manner shown in Fig. 9. In the mid-portion to be strained by compressive forces, the sheets are kept together by clamping jaws 31 with the aid of bolts 32 to prevent the sheets from being bent outwards. For completing the magnetic circuit, use is made of the shell-sheets 3b placed at the lateral areas between the sheets 1g the shell sheets being, for instance connected to the core sheets by means of screw bolts, after the test winding 2d has been placed on the core.

The core sheets can also be adapted for the measurement of tensile forces, by providing pull eyes or the like.

The test box shown in Figs. 10, 11 and 12 is particularly suitable for measuring tensile forces. The test body consists here of say three elongated sheets 1h, having at their two ends holes for accommodating means designed to transmit tensile forces. The test body carries in its mid-portion a test winding 2e. The yoke-sheets 3c and the intermediate sheets 3d serve for the establishment of the uninterrupted magnetic circuit after the manner of a shell core.

Another constructional example is shown in section in Fig. 13, from which, for the sake of simplicity, the test winding as well as the yoke have been omitted. The test body proper consists of a cylindrical hollow body 1i, closed at one end by a bottom 4 shaped as a pressure piece. It carries in the middle a short cylindrical projection slipped into a tube 10. The open end of the hollow cylinder 1i is connected by means of screws 7 to another pressure piece 5'' provided with an axial screw-threaded opening to accommodate a pressure screw 11. The piston-like end of the screw 11 is introduced into the tube 10 which accommodates within it a helical spring 9. The screw 11 permits of varying the tensile force of the helical spring 9 and of conveniently adjusting thereby the tensile bias acting on the test body 1i. The tensile bias should be chosen so as to be slightly superior to the peak value of the compressive forces under test.

In a similar manner, a compressive bias can, of course, also be applied to a test body, for instance, by means of a pull spring.

Fig. 14 shows a test body consisting of a cylindrical tube 1j as connected by means of screws 34 with the heads 4a, 5a, equipped with pull rods 32 and 33 respectively in such a manner that tensile forces exerted through the eyes 42 or 43 respectively are transmitted as compressive forces to the tube 1j. By unscrewing the fastening nuts 37 and 38, the pull rods can be disconnected for removal.

The test box according to Fig. 14 may also be used for measuring compressive forces by directly acting on the heads 4a and 5a.

In the constructional example shown in Figs. 15 and 16 use is made as a test body of the tapered front portion of the area of a ring-shaped cut-out sheet 1k which, by means of the stamps 4b, 5b is exposed to the compressive forces under test, perpendicularly to the surface of the sheet. In order to reduce the magnetic resistance at such portion of the magnetic circuit, as is designed to close the lines of force, the cross-section of the iron may, if desired, be increased by piling up other correspondingly graduated sheets 3e with interposed insulating layers. The test winding 2f is, in this case, placed as a segmental winding on that portion of the magnetic circuit which has been reinforced by the piling-up of the sheets 3e.

I claim:

1. In a device for measuring mechanical forces in combination a magnetizable body having a portion subjected to the forces under test and another portion free from the influence of said forces, an exciting winding connected to an A. C. source, for magnetizing said body, at least one portion of said body consisting of magnetically highly conductive material and closing the alternating field produced by said exciting winding, the permeance of the body portion free from the influence of the forces under test being high as compared with the permeability of the body subjected to said forces and an electric measuring device for determining the permeance of the magnetic circuit formed in this manner.

2. In a device for measuring mechanical forces in combination a constructional part of magnetizable material having a portion subjected to the forces under test and another portion free from the influence of said forces, an exciting winding connected to an A. C. source for magnetizing said constructional part, at least one portion of said body consisting of magnetically highly conductive material and closing the alternating field produced by said exciting winding, the permeance of that portion of the constructional part which is free from the influence of the forces under test being high as compared with the permeance of the magnetic circuit formed in this manner.

3. In a device for measuring mechanical forces in combination a body having a portion subjected to the forces under test, and another portion free from the influence of said forces, said body consisting of a material, in the monocrystals of which the magneto-striction in the crystallographic axes is of equal sign, an exciting winding connected to an A. C. source for magnetizing said body, at least one portion of said body consisting of magnetically highly conductive material and closing the alternating field, produced by said exciting winding, the permeance of that portion of the body which is free from the influence of the forces under test being high as compared with the permeability of the body subjected to said forces, and an electric measuring device for determining the permeance of the magnetic circuit formed in this manner.

4. In a device for measuring magnetic forces in combination a body having a portion subjected to the forces under test, and another portion free from the influence of said forces, said body consisting of a nickel-iron alloy having a nickel percentage of 40 to 80, an exciting winding connected to an A. C. source for magnetizing said body, at least one portion of said body consisting of magnetically highly conductive material and closing the alternating field produced by said exciting winding, the permeance of that portion of the body which is free from the influence of the forces under test being high as compared with the permeance of the body portion subjected to said forces, and an electric measuring device for determining the permeance of the circuit formed in this manner.

5. In a device for measuring mechanical forces in combination a magnetizable body having a portion subjected to the forces under test and another portion free from the influence of said forces, an exciting winding connected to an A. C. source for magnetizing said body, at least one body consisting of magnetically highly conductive material and closing the alternating field produced by said exciting winding after the manner of a shell transformer, the permeance of that portion of the body which is free from the influence of the forces under test being high as compared with the permeance of the body portion subjected to said forces, and an electric measuring device for determining the permeance of the circuit formed in this manner.

6. In a device for measuring magnetic forces in combination a magnetizable body having a portion subjected to the forces under test and consisting of several thin-walled portions extending in the direction of the strain produced by the forces under test and another portion free from the influence of said forces, an exciting winding connected to an A. C. source for magnetizing said body, at least one portion of said body consisting of magnetically highly conductive material and closing the alternating field produced by said exciting winding, the permeance of that portion of the body which is free from the influence of the forces under test being high as compared with the permeability of the body subjected to said forces, and an electric measuring device for determining the permeance of the circuit formed in this manner.

7. In a device for measuring mechanical forces in combination a magnetizable body having a portion subjected to the forces under test and consisting of several concentric hollow cylinders and another portion free from the influence of said forces, an exciting winding connected to an A. C. source, for magnetizing said hollow cylinders, at least one portion of said body of magnetically highly conductive material closing the alternating field produced by said exciting winding, the permeance of that portion of the body which is free from the influence of the forces under test being high as compared with the permeance of the body subjected to said forces, and an electric measuring device for determining the permeance of the magnetic circuit closed in this manner.

8. In a device for measuring mechanical forces in combination a magnetizable body having a portion subjected to the forces under test and consisting of a solid cylinder and several concentric hollow cylinders and another portion free from the influence of said forces, an exciting winding connected to an A. C. source, for magnetizing said cylindrical bodies, at least one portion of said body consisting of magnetically highly conductive material and closing the alternating field produced by said exciting winding, the permeance of that portion of the body which is free from the influence of the forces under test being high as compared with the permeance of the body portion subjected to said forces, and an electric measuring device for determining the magnetic permeability of the circuits formed in this manner.

9. In a device for measuring mechanical forces in combination a magnetizable body having a portion subjected to the forces under test and consisting of several sheets kept together by a clamping device so as to prevent the different sheets from being bent outwards under the action of the forces under test and another portion free from the influence of said forces, an exciting winding connected to an A. C. source for magnetizing said body closing the alternating field produced by said exciting winding, the permeance of that portion of the body which is free from the influence of the forces under test being high as compared with the permeance of the body portion subjected to said forces, and an electric measuring device for determining the permeance of the magnetic circuit formed in this manner.

10. In a device for measuring mechanical forces in combination a magnetizable body having a portion subjected to the forces under test and consisting of several sheets and another portion free from the influence of said forces, two clamping pieces, fastening means to keep the sheets together by means of said clamping pieces, said clamping pieces being so designed as to absorb part of the forces under test in the strained condition, an exciting winding connected to an A. C. source for magnetizing said body, at least one portion of said body consisting of magnetically highly conductive material and closing the alternating field produced by said exciting winding, the permeance of that portion of the body free from the influence of the forces under test being high as compared with the permeance of the body portion subjected to said forces, and an electric measuring device for determining the permeance of the magnetic circuit formed in this manner.

11. In a device for measuring mechanical forces, in combination, a one-piece body made of magnetizable material and comprising a portion subjected to the forces under test and another portion, integral with said first-mentioned portion, free from the influence of said forces, an exciting winding, adapted for connection with a source of alternating current, for magnetizing said body, at least one portion of said body consisting of material having high magnetic conductivity, the permeance of that body portion which is free from the influence of the forces under test being high as compared with the permeance of the body portion subjected to said forces, and an electrical measuring device for determining the permeance of the magnetic circuit thus formed.

WILHELM JANOVSKY.